Nov. 25, 1958 F. ZECHA ET AL 2,861,862

DICTATION APPARATUS

Filed June 16, 1954 2 Sheets-Sheet 1

INVENTORS
FERDINAND ZECHA
FRITZ LAMPE

BY [signature]

AGENT

Nov. 25, 1958 F. ZECHA ET AL 2,861,862

DICTATION APPARATUS

Filed June 16, 1954 2 Sheets-Sheet 2

INVENTORS
FERDINAND ZECHA
FRITZ LAMPE
BY
Fred M Vogel
AGENT

United States Patent Office 2,861,862 Patented Nov. 25, 1958

2,861,862

DICTATION APPARATUS

Ferdinand Zecha and Fritz Lampe, Vienna, Austria, assignors, by mesne assignments, to North American Philips Company, Inc., New York, N. Y., a corporation of Delaware Application June 16, 1954, Serial No. 437,230

Claims priority, application Austria June 27, 1953

3 Claims. (Cl. 346—138)

The present invention relates to dictation apparatus. More particularly, the invention relates to a dictation apparatus comprising a record medium in the form of a foil tended or wound on a cylindrical drum, the beginning of the foil being secured on a generatrix of the cylindrical drum.

In dictation apparatus of the magnetic recording type it is known to use a record medium in the form of a thin foil which is tended on a cylindrical drum in a manner such that it completely covers the drum surface. The foil is tended primarily in two steps on the drum. In the first place, the edge of the foil must be secured to the drum in a manner such that this edge coincides with a generatrix of the drum surface or is accurately parallel thereto. Then the drum is rotated in the winding-up direction, which is opposite the direction of the free edge of the foil. Thus the foil is wound on the cylindrical surface. If the secured edge of the foil is accurately positioned, the two edges being at right angles thereto form accurate circles about the cylindrical surface and the wound foil is then bounded by two circular lines. The foil then has the accurate shape of a cylindrical sheath cut off at the two ends by circles. This is absolutely required, if, for example, a helix written on the foil during recording must regain the form of a helix after the foil has been flattened and retended.

Various methods are known for carrying out these operations, i. e. securing the thin foil to the drum. The edge to be secured may be reinforced by a strip of rigid material and hooked by this strip in a slot of the drum. In a further method the foil is provided with apertures, which may, if desired, be reinforced by eyelets, and which may be hooked to corresponding guide members, for example pins on the drum. These methods have a disadvantage in that only particular foils can be used with particular apparatus.

Whatever the method of securing the foil edge to the drum may be, the drum must at any rate be rotated in the correct direction (winding-up direction). The connection may be loosened and the foil may be damaged by rotation in the wrong direction.

The invention has for its object to render the two performances as far as possible independent of the abilities and the attention of the operator. The invention furthermore permits the use of foils of any material and shape, provided that the size and the magnetic properties are suitable, while the correct position of the foil is automatically ensured.

According to the invention, provision is made of a driving gear, of a stop member (freewheel drive and pawl) permitting the drum, upon being driven, to rotate only in the winding-up direction of the foil, a free rotation being obtained in the opposite direction. Use may be made of one or more pawls which block the rotation of the drum completely at will. It is efficient to arrange the stop for the drum in a manner such that upon actuation the correct position of the slot for securing the record medium is immediately obtained.

The driving gear and the stop member, or the like, are preferably seated directly on the drum shaft and are preferably arranged within a covering knob. The turning of the knob in the correct direction causes the rotation of the drum and winding up of the foil; the turning of the knob in the wrong direction causes the free rotation of said knob, since it does not engage the drum.

According to a further feature of the invention, the stop of the drum is preferably such, if the foil is clamped tight in a slot in the drum surface, which slot may be rendered accessible by actuating (for example, lifting, pivoting or the like) a flap, that the flap is only actuated simultaneously with the attainment of the stop position of the drum.

The control-device for the flap may be constituted by a pawl stud movable against a force (for example, a spring force), to which the control-element(s) of the flap (for example, an eccentric, a lug, a wedge, or the like) can be secured, this element being disengaged in the normal operational position of the dictation apparatus. During the actuation of the pawl stud, or thereafter (for example, displacement in an aperture in the drum side wall or against a stop or the like), the flap is automatically lifted or the control-device of the flap is caused to engage the flap, which can thus be lifted or rotated by rotating the eccentric or the lug, or by displacing the wedge.

In order that the invention may be readily carried into effect, it will now be described more fully with reference to the accompanying drawings, wherein:

Fig. 1 is a plan view of an embodiment of the apparatus of the present invention, with the drum, the control-device for tending the foil, the embodiment chosen being provided with a slot for securing the foil, this slot being rendered accessible by lifting or pivoting a flap;

Figs. 2*a* and 2*b* are partial sectional views of a portion of the embodiment of Fig. 1;

Figure 1:
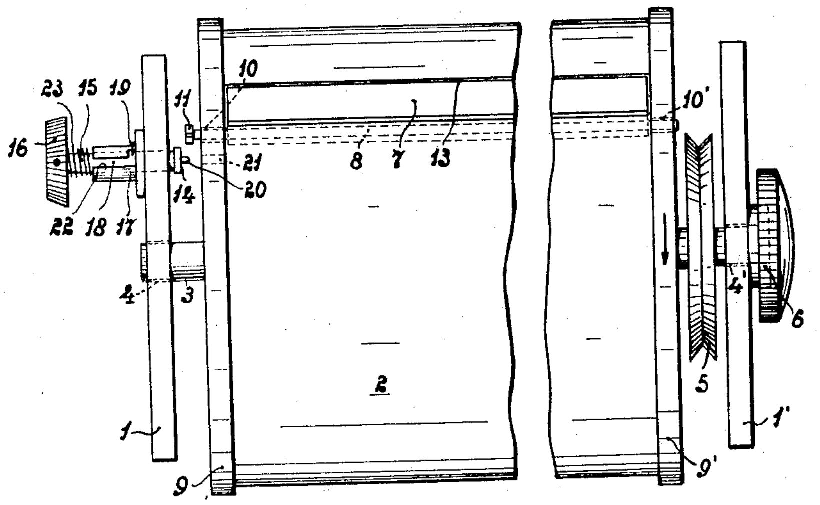
Figures 2A, 2B:
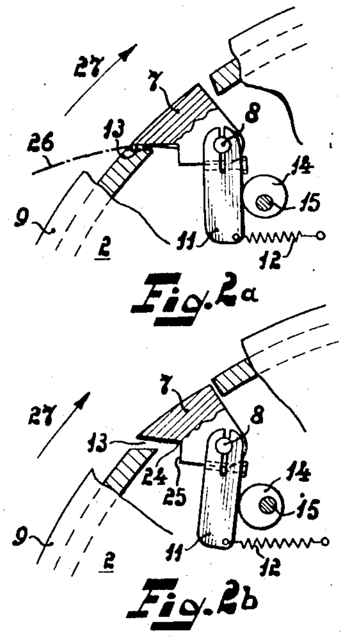

In the embodiments of Figs. 1, 2*a* and 2*b*, the two bearings 1 and 1' for the drum 2 are secured to a base plate (not shown). The drum is rotatable about the shaft 3 in the bearing cushions 4 and 4.' Rotation occurs upon the actuation of the dictation apparatus by means of the driving mechanism (not shown) via the wheel 5. For the application of the foil, the drum may be turned into an easy position by means of the knob 6. The knob 6 is provided with known means in a manner such that upon rotation, viewed from the knob, the drum is turned only in a clockwise direction. If the knob 6 is turned in a counterclockwise direction, it does not engage the drum.

Thus the tended foil is prevented from being loosened from the drum and from being damaged by rotation of the drum in the wrong direction.

Conversely, it is not possible to hold the drum in the suitable position for securing the edge of the foil only by holding the rotary knob.

In order to render this possible and to permit the securing of the foil automatically in the position which is most suitable for this purpose, the aforesaid stop for the drum may be provided in accordance with the invention. Thus, the operator has his hands free for manipulating the foil. Hereinafter the securing device for the foil with the flap and the stop member for the drum are explained more fully with reference to the embodiment shown in the drawing.

The cylinder surface of the drum is cut open along two generatrices and the part of the surface lying between is removed. The space thus formed is filled by the flap 7, the particular shape of which is illustrated in Figs. 2*a* and 2*b*. The flap 7 is rotatable about the shaft 8, which is journalled in the two side surfaces 9 and 9′ of the drum in the bearings 10 and 10′, respectively. Outside the side surface 9 of the drum, the shaft 8 of the flap supports a lever 11, which is held in the rest position by a spring 12 (Fig. 2*a*) in a manner such that the flap 7 completely fills its housing slot in the surface of the drum 2. If the lever 11 is lifted against the spring force, the flap rotates about the shaft 8 and the slot 13 is set free for the introduction of the foil. When the flap 7 is lowered the edges of the flap and the drum surface clamp the foil tight.

The motion of the lever 11 in the embodiment shown is obtained by means of the eccentric 14, secured to a shaft 15 which may be controlled by the knob 16. The shaft 15 is rotatable in the bearings 17. The bearing cushion is provided with slots 22. The shaft 15 is provided with a stud 18, which is displaceable in the slot 22. The shaft 15 can rotate only when the knob 16 is pressed inwardly, or toward the drum, to such an extent that the stud 18 can engage the section 19. When the stud 18 engages the section 19, the eccentric 14 occupies such a position relative to the lever 11 that said lever can be lifted. At the same time, a projection 20 of the shaft engages a bore 21 in the side surface 9 of the drum and thus stops the rotation of the drum. The spring 23 urges the knob 16 away from the surface 9 when the stud 18 lies in the slot 22. Consequently, in order to lift the flap 7, the knob 16 is pressed inwardly, or toward the drum, the drum is rotated by the knob 6 until the projection 20 of the shaft engages the bore 21 and the flap is opened by rotating the knob 16.

From Figs. 2*a* and 2*b* the particulars of the flap 7 are evident. The most essential aspect of the shape of the flap is the notch 24 (Fig. 2*b*), which forms the surface 25. The surface 25 serves as a stop for the edge of the foil 26. The arrow 27 designates the direction of rotation of the drum, obtained by actuating the knob 6.

Fig. 2*a* shows the flap 7 in the closed position, whereas Fig. 2*b* shows said flap in the open position.

Figure 3:
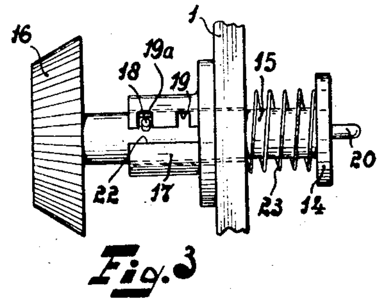
Figs. 3 and 4 are other embodiments of a stop member and of the device for releasing and closing the slot in the drum of the apparatus of the present invention.

Fig. 3 is another embodiment of a control-device for the flap for opening and closing a slot of the drum. The bolt 15 is supported from the bearing cushion 1, the bearing 17 of the bolt 15 having lateral recesses or transverse slots 19 and 19*a* therein. A bore is provided in the side surface 9 of the drum radially from the bolt 15 to the shaft 3. The stud 18 holds the bolt 15 in the position shown, so that the drum can rotate unhindered without affecting the flap 7. For engaging or disengaging a foil, the bolt 15 is rotated to such an extent that the stud 18 moves out of the recess 19*a* into the slot 22, after which the bolt 15 is urged by the spring 23 against the side surface 9 of the drum. Upon rotation of the drum, the bolt 15 snaps into a particular position in the bore, so that the drum is blocked and prevented from rotating further. As in the embodiment shown in Fig. 1, by rotation of the knob 16 the flap 7 can be opened to introduce the foil, the stud 18 sliding into the slot 19. This has the advantage that in finding the correct position of the drum for securing the foil by means of the knob 6, the knob 16 need not be depressed and that after a small turn of the knob 16 until the stud 18 can move in the slot 22, the drum is automatically stopped at the correct instant.

Figure 4:
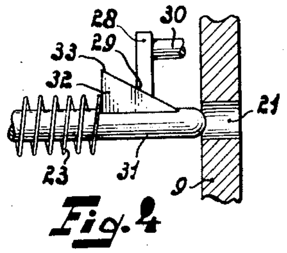
Figure 5:
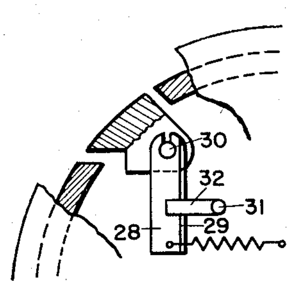
Fig. 5 is a side elevational view, partly in section, of the embodiment constructed in accordance with the illustration of Fig. 4.

In the embodiment shown in Fig. 4, in which the lug 14 is replaced by a slanting surface 33, the flap 7 is automatically opened without rotating knob 16 so that the transverse slot 19 shown in Fig. 3 may be omitted. Opening of the flap is accomplished when the slanting side 33 of the extension 32 engages the stop surface 29 of part 28 and moves over the slanting side in a manner such that the flap 7 pivots about the shaft 30 (corresponding to the shaft 8 of Figs. 2*a* and 2*b*), so that the slot or the gap 13 is opened for securing or removing the foil. The cooperation of surfaces 29 and 33 of parts 28 and 32 respectively is shown in Fig. 5, which is a cross-sectional view of Fig. 4 through part 28. The parts 28 and 32 are shaped in a form such that the wedge 32 is positioned below the lever 28 when the stud 31 begins to penetrate into the aperture or bore 21. When stud 31 is inserted in the aperture 21 in the side wall of the drum 9 under the action of spring 23, the rotation of the drum is stopped. When the foil has been secured, the stud 31 is withdrawn, so that the flap 7 (if necessary, by means of an additional spring) is closed and the foil is clamped tight. At the same time the drum is set free, so that it can rotate again (only in the direction in which the foil is secured).

Of course, other embodiments are possible within the scope of the invention.

Figure 6:
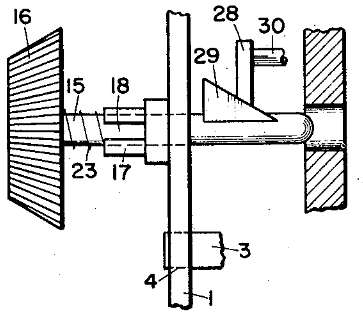
Fig. 6 is an enlarged front elevational view of another embodiment of the apparatus of the present invention.

It is more particularly possible to construct the stop member for the drum and to arrange it in the apparatus in a manner such that during normal operation this member is disengaged and engaged manually against a spring force as shown in Fig. 6. In this position, the member can be fixed in accordance with the invention, it remaining in this position until the blocking is released manually. Then due to the said force (spring force) the member returns automatically into the free starting position. However, the stop member may be formed in a manner such that subsequent to the manual release of the blocking, under the action of a force (for example, a spring force) it automatically occupies the stop position. In this position, the member is held until it is moved back manually into the blocking position against the action of the said force and is held in this (free) position.

According to the invention, the control-device of the flap shown in Fig. 4 and the stop member shown in Figs. 2*a* and 2*b* may be combined, as shown in Fig. 6. For example the lateral slot 22 of the embodiment of Fig. 1 may be omitted and instead of the lug, the wedge 32 shown in Fig. 4 may be secured with its operative surface 33 to the shaft or the bolt 15. At the same time the lever arm 11 of Figs. 2*a* and 2*b* must then be replaced by a part shaped in accordance with the wedge 28, 29.

While the invention has been described by means of specific examples and in specific embodiments, we do not wish to be limited thereto, for obvious modifications will occur to those skilled in the art without departing from the spirit and scope of the invention.

What is claimed is:

1. A dictation apparatus for recording information on a foil type recording medium, comprising a plurality of spaced bearing supports, a cylindrical drum having an elongated groove extending in a direction substantially parallel to the central axis of said drum, means mounting said drum on said supports for rotation around said central axis thereof, a clamping member extending in said groove and having open and closed positions for inserting and securing said foil to said drum, an extension on said clamping member for alternately opening and closing the latter, driving means operably connected to said drum for rotating the same in one direction and being disconnected when said drum is rotated in the opposite direction, slidable blocking means mounted adjacent said drum for arresting the rotational movement of the drum in a predetermined position including an actuating means for engaging and moving said extension whereby the clamping member may be alternately opened and closed, and means mounting said slidable blocking means.

2. A dictation apparatus for recording information on a foil type recording medium as claimed in claim 1, in which said blocking means is mounted on a bearing support, and the extension on said clamping member and the actuating means are both wedge-shaped members having engageable surfaces thereon to open and close said clamping member when the blocking means arrests the rotation of the drum.

3. A dictation apparatus for recording information on a foil type recording medium, comprising a plurality of spaced bearing supports, a cylindrical drum having at least one end wall with an aperture therein and an elongated groove extending in a direction substantially parallel to the central axis of said drum, means mounting said drum on said supports for rotation around said central axis, a clamping member extending in said groove and having open and closed positions for inserting and securing said foil to said drum, an extension on said clamping member for alternately opening and closing the latter, driving means operably connected to said drum for rotating the same in one direction and being disconnected when said drum is rotated in the opposite direction, slidable blocking means mounted on at least one of said bearing supports including a stud insertable in the aperture in the wall of said drum for arresting the rotational movement of said drum, and a cam member on said blocking means for engaging and moving the extension on said clamping member whereby the clamping member may be alternately opened and closed.

References Cited in the file of this patent

UNITED STATES PATENTS

| | | |
|---|---|---|
| 561,316 | Hepp | June 2, 1896 |
| 809,127 | McDonald et al. | Jan. 2, 1906 |
| 1,783,093 | Molins | Nov. 25, 1930 |
| 2,622,000 | Thompson | Dec. 16, 1952 |